(No Model.)
P. ROHNE.
CLAMP FOR LINES.
No. 554,006. Patented Feb. 4, 1896.
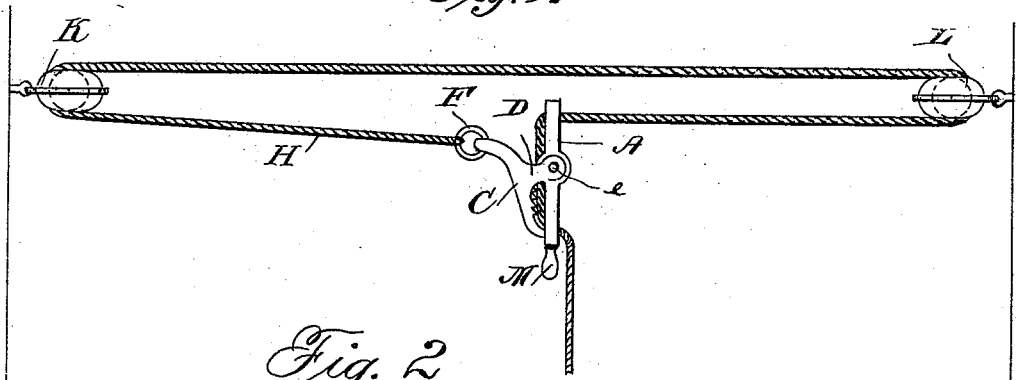
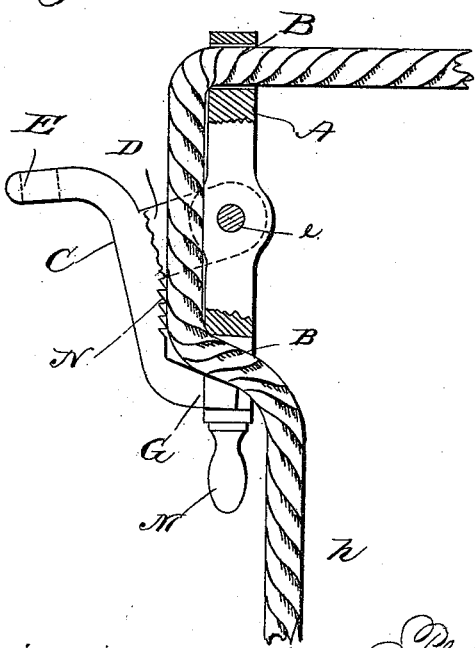
WITNESSES:
M. B. Harris
C. Gerst
INVENTOR
Philip Rohne
BY
Edgar Tate & Co
ATTORNEY

UNITED STATES PATENT OFFICE.

PHILIP ROHNE, OF NEW YORK, N. Y.

CLAMP FOR LINES.

SPECIFICATION forming part of Letters Patent No. 554,006, dated February 4, 1896.

Application filed September 16, 1895. Serial No. 562,606. (No model.)

*To all whom it may concern:*

Be it known that I, PHILIP ROHNE, a citizen of the United States, and a resident of New York, in the county of New York and State of New York, have invented certain new and useful Improvements in Clamps for Lines, of which the following is a specification, reference being had to the accompanying drawings, forming a part thereof, in which similar letters of reference indicate corresponding parts.

This invention relates to clamps for holding clothes-lines and similar lines, ropes or cables and for taking up the slack or sag therein, and the object thereof is to provide an effective device of this class which is simple in construction and operation, and which is also comparatively inexpensive; and with this and other objects in view the invention consists in the construction, combination and arrangement of parts hereinafter described.

The invention is fully disclosed in the following specification, of which the accompanying drawings form a part, in which—

Figure 1 is a side elevation of my improved device, showing also a line and the method of operation; and Fig. 2 is a similar view of the clamp, parts thereof being in section.

My improved clamp comprises an oblong block or plate A, having end apertures or openings B, and pivotally connected with said block is a lever C, having side arms D, which are pivotally connected with the block or plate A by means of a shaft or bolt e.

The outer end of the lever C is provided with a perforation E, in which may be placed a ring F, and the inner end of said lever is curved inwardly, as shown at G, and adapted to enter one of the holes B in the block or plate.

The operation will be readily understood from the foregoing description, when taken in connection with the accompanying drawings. One end of the line or cable H is attached to the ring F, or if desired it may be attached to the end of the lever C, and said line or cable is then passed around a pulley K, which is properly supported, and then around another pulley L, which is also properly supported, and the line or cable is then passed through one of the openings B in the block or plate A, and thence between the arms D of the lever C, and through the other opening B, as clearly shown in Figs. 1 and 2. The block or plate A is also provided with a knob or handle M, and the lever C with serrations or teeth N on the inner surface thereof, and whenever it is desired to tighten the line it is only necessary to take hold of the end h thereof and pull it through the block or plate A, at the same time depressing with the hand the outer end of the lever C, and when the line has been pulled taut the lever C is released and immediately assumes the position shown in Fig. 2, and the slipping of the line through the block or plate A is prevented by means of the teeth or serrations on the lever C and the end G thereof.

My invention is not limited to the exact form, construction and arrangement of parts shown and described; and I therefore reserve the right to make all such alterations therein as fairly come within the scope of the invention.

Having fully described my invention, I claim and desire to secure by Letters Patent—

A clamp for taking up the slack in lines, which consists of a block or plate having holes or openings in each end thereof, through which the line is adapted to be passed, a lever provided with side arms which are pivotally connected with said plate, one end of said lever being adapted to be connected with the end of the line, and the inner surface thereof being provided with serrations or teeth, and the end of the lever opposite that with which the line is connected being curved inwardly and adapted to enter one of the holes or openings in the end of the plate or block, substantially as shown and described.

In testimony that I claim the foregoing as my invention I have signed my name, in presence of the subscribing witnesses, this 14th day of September, 1895.

PHILIP ROHNE.

Witnesses:
C. GERST,
A. M. CUSACK.